Figure 3:
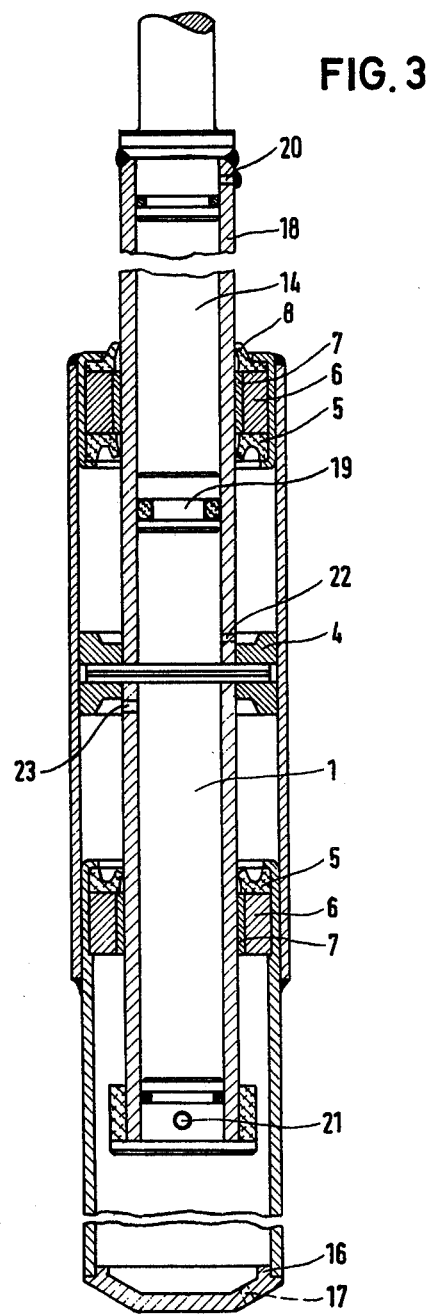

United States Patent [19]

Peddinghaus et al.

[11] 4,085,925
[45] Apr. 25, 1978

[54] HYDRO-PNEUMATIC SHOCK ABSORBER

[75] Inventors: Carl Ullrich Peddinghaus, Obere Lichtenplatzer Str. 276, 56 Wuppertal-Barmen, Germany; Franz Josef Overkott, Gevelsberg, Germany

[73] Assignee: Carl Ullrich Peddinghaus, Wuppertal-Barmen, Germany

[21] Appl. No.: 672,454

[22] Filed: Mar. 31, 1976

[51] Int. Cl.² .............................................. F16F 5/00
[52] U.S. Cl. .................................. 267/64 R; 188/282; 188/315
[58] Field of Search ........................... 267/64 R, 64 A; 280/708; 213/43; 188/282, 311, 315, 322

[56] References Cited

U.S. PATENT DOCUMENTS

| 2,630,193 | 3/1953 | Funkhouser | 188/315 |
| 3,593,977 | 7/1971 | Hahn | 188/282 |
| 3,970,292 | 7/1976 | Dachicourt et al. | 267/64 R |

FOREIGN PATENT DOCUMENTS

| 812,993 | 5/1937 | France | 267/64 R |
| 972,765 | 10/1964 | United Kingdom | 267/64 R |

*Primary Examiner*—James B. Marbert
*Attorney, Agent, or Firm*—Kane, Dalsimer, Kane, Sullivan and Kurucz

[57] ABSTRACT

Hydro-pneumatic shock absorber of the kind comprising a fluid-containing cylinder which is divided into two chambers of variable volume by a piston mounted on a piston rod, there being also provided a compensation chamber for displaced fluid, a compressed gas pressure being maintained within said compensation chamber, wherein the aforesaid piston is secured to the middle of the piston rod which projects through a gland at each end of the cylinder, at least one of said two chambers of variable volume communicating with said compensation chamber by means of a communication port.

7 Claims, 5 Drawing Figures

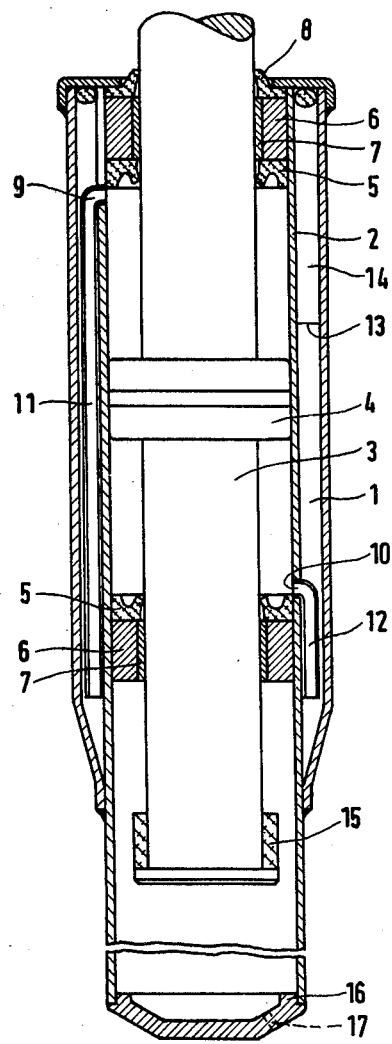
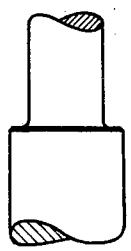
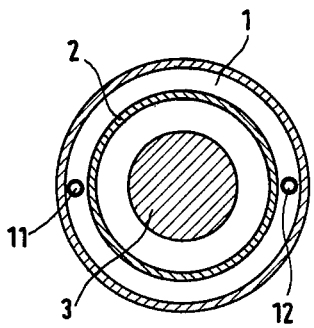

HYDRO-PNEUMATIC SHOCK ABSORBER

This invention relates to a hydro-pneumatic shock absorber, particularly for use in vehicles (such as road or rail vehicles), of the kind wherein a piston mounted on a piston rod subdivides the interior of a fluid-containing cylinder into two chambers of variable volume, and wherein an equalising or compensation chamber is provided for the absorber fluid and a raised gas pressure is maintained within said chamber.

Numerous forms of shock absorbers of the kind specified are known. These include devices wherein the compensation chamber is concentric with the cylinder, for example as in the so-called double-tube absorber device described in German PS No. 1 284 693. In this device the compensation chamber is annular and surrounds the cylinder and communicates with the absorber fluid in the cylinder by means of a fluid duct. The piston, which is equipped with damper valves, is secured to the end of the piston rod so that the compensation chamber accepts the fluid displaced by the piston rod when the piston rod enters into the cylinder and returns the fluid when the piston rod moves outwardly again. Furthermore, a raised pressure level is maintained in the compensation chamber by means of a compressed gas in order to prevent cavitation effects in the region of the valve ports of the piston valves through which the fluid passes, which effects would cause considerable modifications to the damper characteristics of the valves.

However these conventional devices are afflicted by a disadvantage which resides in the fact that the piston rod is subjected to considerable outwardly directed thrust or expulsion forces created by the pressurised gas which may have an excess pressure of between approximately 20 to 40 atmospheres, and in that these forces increase further still with rising temperature levels of the whole system after prolonged service. As a result of this, the shock absorber becomes comparatively rigid and this will modify the elasticity characteristics of the shock absorber in service. There are also various undesirable side effects. It is true that these side effects may be somewhat moderated by using very thin piston rods, yet this again raises the danger of such piston rods bending or even buckling out of true during service. On the other hand, if the cross-sectional dimensions of the piston rod are selected so as to be relatively large in order to preclude this type of damage, the above-mentioned impairment with regard to elasticity must be inevitably accepted. For this reason it has hitherto been possible to make sufficiently rigid hydro-pneumatic shock absorbers only at the expense of considerable additional constructional outlay.

The object of the present invention is to provide an improved hydro-pneumatic shock absorber which does not suffer from the aforementioned disadvantages.

In accordance with the invention there is provided an hydro-pneumatic shock absorber of the kind wherein a piston mounted on a piston rod subdivides the interior of a fluid-containing cylinder into two chambers of variable volume, and wherein a compensation chamber is provided for the absorber fluid and a compressed gas pressure is maintained within said chamber, characterised in that the piston is secured to the piston rod approximately in the middle of said rod which in turn projects through a gland at each end of the cylinder and in that at least one of said two chambers of variable volume communicates with said compensation chamber by means of a communication port.

If the piston rod is pushed inwardly into a shock absorber constructed as above defined this will not cause any change of volume in the fluid contained within the cylinder. On the contrary, the sum of volumes on either side of the piston always remains constant. Inasmuch as absorber fluid is exchanged through the communicating ports with the common compensation chamber, the amount of fluid entering on one side will always correspond to that displaced on the other. However, this compensation chamber is by no means dispensable altogether because the temperature of the fluid will progressively increase during working. Moreover, as this chamber is constantly maintained under pressure, there can be no cavitation effects in the region of any damping valves. The pressure within the compensation chamber is conveniently established in a per se conventional manner with the aid of a compressed gas, and its value may be selected virtually as high as may be desired because it does in no way affect the piston rod displacement. On the contrary, the such piston rod displacement can be obtained at relatively different rates in the two directions of piston rod movement solely through the action of the damping valves.

In a shock absorber according to this invention, the piston may be a conventional piston with valves of relatively different damping force opening in both directions of flow of the absorber fluid. On the other hand, the piston may be without ports or apertures but in that event the communicating ports themselves have valves which open in both directions of flow for the absorber fluid.

In veiw of the fact that only a limited amount of space is usually available for shock absorbers in motor-cars for example, especially in the longitudinal direction, one advantageous embodiment of the invention provides for the compensation chamber to assume the shape of an outer sleeve surrounding the cylinder; in this arrangement one of the communicating ports is situated immediately beneath the upper seal or gland of the cylinder and the other immediately above the lower seal whilst ducts issue from both these ports and terminate in the lower region of the compensation chamber. Since the compressed gas is contained in the upper region of the sleeve-like compensation chamber in this embodiment, the duct ends have no communication at all with the compressed gas so that only very little of this compressed gas can be absorbed by the operative fluid.

Alternatively, and especially in view of the fact that the present invention requires a much smaller compensation chamber than in conventional devices, this chamber may be accommodated, in a per se known fashion, within the piston rod which would then be of hollow conformation. Having due regard to the size of the compensation chamber the piston rod may then be readily designed with sufficiently thick walls to meet all practical operational needs and requirements. In such a piston rod the communicating ports would be situated immediately above and immediately below the piston. A division or separation relative to the compressed gas volume likewise contained within the piston rod is then effected by a dividing piston or plunger.

Advantageously, and particularly as applied to shock absorbers in motor vehicles, the shock absorber may be designed with an upwardly extendable piston rod adapted to be connected to the vehicle body by conventional securing means. Accordingly, the opposite or lower end of the piston rod projects through the lower gland from the lower cylinder end. As a protection against dirt, which may constitute a real danger, particularly for the lower part of the piston rod, and further for the purpose of providing suitable securing means, e.g. an axle-limb bolt, the cylinder is conveniently extended in the downward direction beyond the lower gland so that the latter will be surrounded by the cylinder, this extended cylinder portion conveniently has a base or bottom which is closed except for a vent or breather hole to allow the escape of air which in use is displaced by the piston rod, and the bottom of the piston rod has a stop or shoulder of larger diameter which is engageable with the lower gland to limit upward movement of the piston rod relative to the cylinder.

Figure 4:
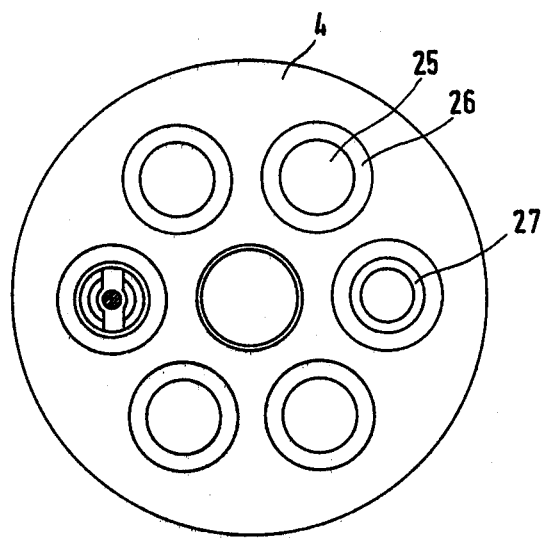
Figure 5:
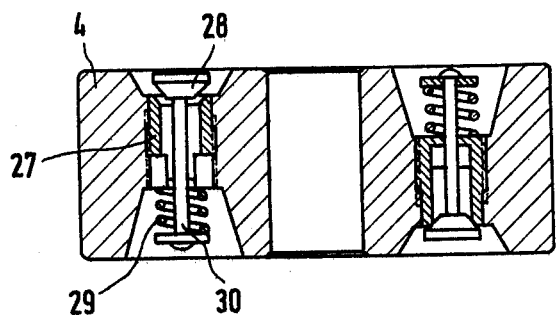

The invention will now be more particularly described with reference to the accompanying drawings wherein FIG. 1 is a sectional elevation of one example of a hydro-pneumatic shock absorber in accordance with the invention, FIG. 2 is a cross section through the cylinder, compensation chamber and piston rod of the construction seen in FIG. 1, FIG. 3 is a sectional elevation of another example in accordance with the invention, FIG. 4 is a plan view (on a larger scale) of a piston designed for use in a shock absorber in accordance with the invention, and FIG. 5 is a cross-sectional view of the absorber piston seen in FIG. 4.

In the arrangement depicted in FIGS. 1 and 2, a compensation or equalizing chamber 1 surrounds the cylinder 2 in the manner of a concentric sleeve. A piston 4 is secured to a piston rod 3 approximately in the middle thereof, the piston being disposed within the cylinder 2. A sealed guide or gland for the piston rod 3 is provided in the upper part of the cylinder 2, said gland comprising a sealing lip 5, an outer guide ring 6, an inner guide ring 7 and a stripper seal 8. A similar sealing guide means comprising elements 5 to 7 is also provided in the lower part of the cylinder 2.

Below the upper seal 5 and above the lower seal 5 there are provided ports 9 and 10 from which issue respectively the ducts 11 and 12 which both terminate in the lower portion of the sleeve-like compensation chamber 1. The latter requires no very large volume because its only essential function resides in equalizing or compensating for thermal expansion variations of the operative fluid. Above the fluid level 13 the compensation chamber is filled with compressed gas 14.

The upper portion of the piston rod 3 projects freely from the cylinder 2 and is provided with means, not here specifically shown, for attachment to a constructional element, e.g. to a vehicle body. The lower portion of the piston rod 3 is surrounded by the lower part of cylinder 2 and is provided with a stop 15 which limits the upward displacement of the piston rod by eventual engagement with the adjacent guides 6, 7. The bottom of the cylinder ends in a base or bottom wall 16 which is provided with a vent or breather hole 17 for air displaced by the lower portion of the piston rod 3.

In the embodiment depicted in FIG. 3, a hollow piston rod 18 accommodates the compressed gas volume 14 and the absorber fluid, the latter being separated from the former by means of a longitudinally slidable separator piston or plunger 19. Compressed gas may be introduced through the opening 20 which may be seen in the upper part of the piston rod 18 and which is adapted to be subsequently closed, whilst the shock absorber may be filled as a whole with operative absorber fluid through a corresponding lower opening 21 in the hollow piston rod.

The cylinder 2 is provided with an upper gland or sealed guide means which comprises the parts 5, 6, 7 and 8 as in the arrangement shown in FIG. 1. The piston rod 18 enters into the cylinder through this gland. Immediately above a piston 4 secured to the piston rod 18, there is a communicating port 22 whilst another communicating port 23 to the interior of the hollow piston rod 18 is arranged below the piston 4. These communication ports afford a direct exchange of operative fluid between the hollow interior of the piston rod 18 and the interior of the cylinder 2 outside said piston rod.

In this embodiment of the invention the cylinder 2 extends less far downwardly than in the other. Instead a smaller diameter cylindrical part 24 is fixedly fitted therein and this in turn accommodates the lower gland comprising the parts 5, 6 and 7. Again the arrangement includes a base or bottom 16 provided with a vent hole 17 and a limiting shoulder or stop element 15.

The piston 4 in either of the above-described constructions may be of solid, i.e. non perforated design. In that event the communication ports 9, 10, or 22, 23 will be vital with regard to shock or vibration absorption and consequently these ports are then provided with appropriate valves which may be arranged to provide different clamping forces in the two directions of movement of the piston 4. However, it will be appreciated that the piston 4 may also be a conventional damper or absorber piston as diagrammatically represented in FIGS. 4 and 5. The plan or top view of the piston 4 here reveals several valve bores 25 having frusto-conical counter-bores 26 and valve seats 27. One of these valve seats 27 is shown in the left side of FIG. 5. It has at one end a face for engagement with a conical valve member 28 whilst at the opposite end it acts as an abutment for a valve spring 29. The latter loads the valve stem 30 in such a way that the valve 28 is normally maintained in its closed position under a predetermined loading force but opens when the piston moves downwardly. Permanently open passageways may also be provided. The right side of the piston 4 seen in FIG. 5 has a similar valve which operates however in the reverse direction and these two valves may be arranged to provide for different damping effects in the two opposite directions of movement of the piston.

We claim:

1. A hydro-pneumatic shock absorber of the kind wherein a piston mounted on a piston rod subdivides the interior of a fluid-containing cylinder into two chambers of variable volume, and wherein a compensation chamber is provided for the absorber fluid and a compressed gas pressure is maintained therein, characterized in that the piston is secured to the piston rod approximately in the middle of said rod which in turn projects through a gland at each end of the cylinder and in that each of said two chambers of variable volume communicates with said comensation chamber by means of a communication port which permits flow of hydraulic fluid therethrough in each of two opposite directions of flow.

2. A hydro-pneumatic shock absorber according to claim 1 in which the piston is provided with valves of relatively different damping force which are arranged to open in both directions of flow of the operative fluid.

3. A hydro-pneumatic shock absorber according to claim 1 in which the communication ports are provided with valves of relatively different damping force which open in both directions of flow of the operative fluid.

4. A hydro-pneumatic shock absorber according to claim 1 in which the piston rod is of hollow conformation and provides said compensation chamber, said communication ports being situated immediately above and immediately beneath the piston.

5. A hydro-pneumatic shock absorber according to claim 4 in which compressed gas contained within said compensation chamber is separated from the operative fluid therein by means of a slidable dividing piston or plunger.

6. A hydro-pneumatic shock absorber of the kind wherein a piston mounted on a piston rod subdivides the interior of a fluid-containing cylinder into two chambers of variable volume, and wherein a compensation chamber is provided for the absorber fluid and a compressed gas pressure is maintained with said chamber, characterised in that the piston is secured to the piston rod approximately in the middle of said rod which in turn projects through a gland at each end of the cylinder, that each of said two chambers of variable volume communicates with said compensation chamber by means of a communication port, that the commpensation chamber surrounds the cylinder in the manner of a concentric sleeve, and in that one of said communication ports is arranged immediately below the upper gland and in that ducts extend from both of said communication ports to terminate in the lower portion of the compensation chamber.

7. A hydro-pneumatic shock absorber of the kind wherein a piston mounted on a piston rod subdivides the interior of a fluid-containing cylinder into two chambers of variable volume, and wherein a compensation chamber is provided for the absorber fluid and a compressed gas pressure is maintained within said chamber, characterized in that the piston is secured to the piston rod approximately in the middle of said rod which in turn projects through a gland at each end of the cylinder, that each of said two chambers of variable volume communicates with said compensation chamber by means of a communication port, that the cylinder extends in the downward direction beyond the lower gland and surrounds the lower end of the piston rod, and in that said lower end of the cylinder has a closed bottom wall provided with a vent for the escape of air displaced by the piston rod, the bottom of said piston rod being provided with a stop or shoulder engageable with said lower gland to limit upward movement of said piston rod.

* * * * *